United States Patent
Oota et al.

(10) Patent No.: US 11,225,547 B2
(45) Date of Patent: Jan. 18, 2022

(54) POLYURETHANE RESIN-FORMING COMPOSITION, MODULE MEMBRANE SEAL MATERIAL USING A HOLLOW-SHAPED OR FLAT MEMBRANE-SHAPED FIBER SEPARATION MEMBRANE USING SAID FORMING COMPOSITION, AND ALLOPHANATE GROUP-CONTAINING POLYISOCYANATE COMPOSITION DERIVED FROM MDI AND PRODUCTION METHOD THEREFOR

(71) Applicant: TOSOH CORPORATION, Shunan (JP)

(72) Inventors: Futoshi Oota, Yokohama (JP); Mitsushige Ikemoto, Yokohama (JP)

(73) Assignee: TOSOH CORPORATION, Shunan (JP)

( * ) Notice: Subject to any disclaimer, the term of this patent is extended or adjusted under 35 U.S.C. 154(b) by 300 days.

(21) Appl. No.: 16/063,691

(22) PCT Filed: Dec. 22, 2016

(86) PCT No.: PCT/JP2016/088416
§ 371 (c)(1),
(2) Date: Jun. 18, 2018

(87) PCT Pub. No.: WO2017/111043
PCT Pub. Date: Jun. 29, 2017

(65) Prior Publication Data
US 2019/0367668 A1    Dec. 5, 2019

(51) Int. Cl.
| | |
|---|---|
| *C08G 18/78* | (2006.01) |
| *C08G 18/18* | (2006.01) |
| *C08G 18/38* | (2006.01) |
| *C08G 18/76* | (2006.01) |
| *C08G 18/32* | (2006.01) |
| *B01D 63/02* | (2006.01) |
| *C08G 18/79* | (2006.01) |
| *C08G 18/80* | (2006.01) |
| *C08G 18/16* | (2006.01) |
| *C08G 18/28* | (2006.01) |
| *C08G 18/22* | (2006.01) |
| *C09K 3/10* | (2006.01) |
| *C08G 18/36* | (2006.01) |
| *B01D 63/08* | (2006.01) |

(52) U.S. Cl.
CPC ........... *C08G 18/78* (2013.01); *B01D 63/023* (2013.01); *C08G 18/168* (2013.01); *C08G 18/18* (2013.01); *C08G 18/1825* (2013.01); *C08G 18/222* (2013.01); *C08G 18/285* (2013.01); *C08G 18/3284* (2013.01); *C08G 18/36* (2013.01); *C08G 18/3825* (2013.01); *C08G 18/3861* (2013.01); *C08G 18/7671* (2013.01); *C08G 18/7837* (2013.01); *C08G 18/797* (2013.01); *C08G 18/8064* (2013.01); *C09K 3/1021* (2013.01); *B01D 63/081* (2013.01); *B01D 2313/04* (2013.01)

(58) Field of Classification Search
CPC .... C08G 18/78; C08G 18/18; C08G 18/3825; C08G 18/3861; C08G 18/7671; C08G 18/7837; C08G 18/797; C08G 18/8064; C08G 18/168; C08G 18/1825; C08G 18/222; C08G 18/285; C08G 18/3284; C08G 18/36; C09K 3/1021; B01D 63/081; B01D 2313/04; B01D 63/023
See application file for complete search history.

(56) References Cited

U.S. PATENT DOCUMENTS

| | | | | |
|---|---|---|---|---|
| 5,541,281 | A | * | 7/1996 | Yeske ................ C08G 18/5015 252/182.15 |
| 5,610,260 | A | | 3/1997 | Schmalstieg et al. |
| 5,705,593 | A | | 1/1998 | Schmalstieg et al. |

(Continued)

FOREIGN PATENT DOCUMENTS

| | | |
|---|---|---|
| CN | 101575405 A | 11/2009 |
| JP | S5398398 A | 8/1978 |
| JP | H07224140 A | 8/1995 |

(Continued)

OTHER PUBLICATIONS

Extended European Search Report dated Jul. 17, 2019, in European Patent Application No. 16878929.5, 6 pages.

(Continued)

*Primary Examiner* — Rabon A Sergent
(74) *Attorney, Agent, or Firm* — Squire Patton Boggs (US) LLP

(57) ABSTRACT

Provided is a composition for forming polyurethane resin having a balance between reactivity and reducing viscosity and successfully imparting low-temperature storage stability, for use in fixing a hollow or flat sheet fiber separation membrane; and an MDI prepolymer containing a large amount of allophanate group without a metal compound and a method for producing the same while successfully controlling a reaction. Solution is provided by using a composition for forming polyurethane resin, containing a specific isocyanate group-containing compound; allophanatizing MDI with a tertiary amine catalyst without containing a metal catalyst; and reacting in the presence of at least one selected from the group consisting of a carboxylic acid amide, a sulfonic acid amide and an active methylene compound.

14 Claims, 2 Drawing Sheets

(56) References Cited

U.S. PATENT DOCUMENTS

2010/0170843 A1* 7/2010 Yamato .............. C08G 18/4816
210/323.1

FOREIGN PATENT DOCUMENTS

| | | | |
|---|---|---|---|
| JP | H09125001 A | | 5/1997 |
| JP | 2004250662 A | | 9/2004 |
| JP | 2004263108 A | * | 9/2004 |
| JP | 2004263108 A | | 9/2004 |
| JP | 2011099119 A | | 5/2011 |

OTHER PUBLICATIONS

International Preliminary Report on Patentability dated Jun. 26, 2018 in International Patent Application No. PCT/JP2016/088416, 6 pages.

International Search Report dated Mar. 21, 2017 for PCT Appication No. PCT/JP2016/088416, 2 pages.

* cited by examiner

POLYURETHANE RESIN-FORMING COMPOSITION, MODULE MEMBRANE SEAL MATERIAL USING A HOLLOW-SHAPED OR FLAT MEMBRANE-SHAPED FIBER SEPARATION MEMBRANE USING SAID FORMING COMPOSITION, AND ALLOPHANATE GROUP-CONTAINING POLYISOCYANATE COMPOSITION DERIVED FROM MDI AND PRODUCTION METHOD THEREFOR

TECHNICAL FIELD

The present invention relates to a composition for forming polyurethane resin; a membrane sealing material for a module having a hollow or flat sheet fiber separation membrane made from the composition for forming; and a polyisocyanate composition with an allophanate group derived from diphenylmethane diisocyanate (hereinafter referred to as MDI) and an alcohol component, and a production method therefor.

BACKGROUND ART

A module with a separation membrane made of hollow fiber or flat membrane is used in a wide variety of fields such as the industrial field of water treatment and the medical field of blood treatment. In particular, the demand for modules in, e.g., water purifiers, artificial kidney and artificial lung has extremely increased. In general, as the membrane sealing material, which is used for bonding/fixing an end of a bundle of modules using a hollow or flat sheet separation membrane, it is widely known to use a polyurethane resin exhibiting excellent flexibility, adhesiveness and chemical resistance at ambient temperature.

As the polyurethane resin, for example, a polyurethane resin obtained by curing an isocyanate group-terminated prepolymer, which is obtained from liquefied diphenylmethane diisocyanate as an isocyanate component and castor oil or a castor-oil derivative polyol, with a polyol, is proposed (see, for example, Patent Literature 1).

However, with respect to the polyurethane resin to be employed in such a use, when a hollow-shaped fiber separation membrane is used as a separation membrane, there is an increasing need of lowering viscosities of an isocyanate group-terminated prepolymer and a polyol in order to improve productivity of membrane modules.

For polyurethane resins used in conventional membrane sealing materials for membrane modules, it is difficult to keep balance among reactivity, reducing viscosity and low-temperature storage stability. Solving such problem is desired.

A polyisocyanate group-terminated prepolymer with an allophanate group, which is derived from MDI and an alcohol, exhibits less MDI precipitation at low viscosity/temperature and is easy to be used. Thus, such prepolymer is widely used due to usefulness in the field of adhesives, foaming agents and others.

As a catalyst for producing an allophanate group from MDI and an alcohol, zinc acetylacetone, a carboxylate of a metal such as zinc, lead, tin, copper and cobalt and a hydrate thereof are known; however, these are all metal compounds and unfavorable for use in medicals and foods.

As a catalyst containing no metal compound for producing an allophanate group from an isocyanate and an alcohol, for example, a quaternary ammonium salt is also known, which includes N,N,N-trimethyl-N-2-hydroxypropylammonium hydroxide and N,N,N-trimethyl-N-2-hydroxypropyl ammonium-2-ethyl hexanoate (see, for example, Patent Literature 2). These quaternary ammonium salts are useful for aliphatic and alicyclic isocyanates; however, these rapidly react with an aromatic isocyanate such as MDI and tend to produce an insoluble crystal as a precipitate as well as these serving as a catalyst are easily inactivated. Because of this, it is difficult to put these in practical use.

As a catalyst for producing an isocyanurate group from an isocyanate group, a tertiary amine with a phenolic hydroxyl group, such as 2,4,6-tris(dimethylaminomethyl)phenol, is known (see, for example, Patent Literature 3). An allophanate group can be produced with this catalyst if an alcohol component is present; however, a large amount of isocyanurate group is produced and compatibility with a polyol deteriorates. Because of this, such catalyst is used limitedly to make urethane resin for adhesive and foam.

CITATION LIST

Patent Literature

Patent Literature 1: Japanese Unexamined Patent Publication No. S53-98398
Patent Literature 2: Japanese Unexamined Patent Publication No. 2011-99119
Patent Literature 3: Japanese Unexamined Patent Publication No. 2004-250662

SUMMARY OF INVENTION

Technical Problem

The present invention was attained in consideration of the Background Art as mentioned above.

A first object of the present invention is to provide a composition for forming polyurethane resin having a balance between reactivity and reducing viscosity, and successfully imparting low-temperature storage stability, for fixing a hollow or flat sheet fiber separation membrane.

A second object of the present invention is to provide an MDI prepolymer containing a large amount of allophanate group without a metal compound and to provide a method for easily controlling a reaction for producing the MDI prepolymer.

Solution to Problem

The present inventors conducted intensive studies with a view to attaining the aforementioned objects. As a result, they found that the first object can be attained by using a composition for forming polyurethane resin containing an isocyanate group-containing compound (a1) (hereinafter also referred to as structure (a1)) represented by the following formula (1) in an isocyanate component (A). They also found that the second object can be attained by a polyisocyanate composition with an allophanate group, which is obtained by a reaction in the presence of at least one compound selected from the group consisting of a carboxylic acid amide, a sulfonic acid amide and an active methylene compound represented by the following formula (2) with a tertiary amine catalyst for allophanatizing MDI without using a metal catalyst; and a method for producing the composition. Based on the findings, the present invention was achieved.

[Chemical Formula 1]

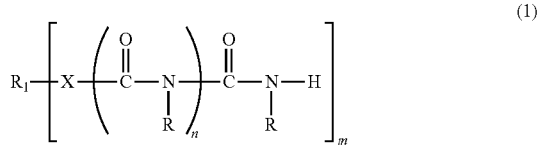

(1)

wherein $R_1$ represents a residue other than an active hydrogen group of an active hydrogen group-containing compound (b1); X represents an oxygen or sulfur atom; R represents a residue comprising an unreacted isocyanate group of an isocyanate group-containing compound (a2); m represents an integer of 1 or 2; n represents an integer of 1 to 30 when m is 1; and n represents an integer of 1 to 15 when m is 2.

[Chemical Formula 2]

(2)

wherein $R_2$ is selected from H, an alkyl group, an alkenyl group, a cycloalkyl group, an arylalkyl group and an aryl group; $R_3$ and $R_4$ are each independently selected from an OH group, an alkyl group, an alkenyl group, a cycloalkyl group, an arylalkyl group, an aryl group, an oxyalkyl group, an oxyalkenyl group, an oxycycloalkyl group, an oxyarylalkyl group and an oxyaryl group.

More specifically, the present invention includes the following embodiments (1) to (16).

(1) An allophanate group-containing composition for forming polyurethane resin, comprising an isocyanate component (A) and a polyol component (B), wherein the isocyanate component (A) contains an isocyanate group-containing compound (a1) represented by the following formula (1):

[Chemical Formula 3]

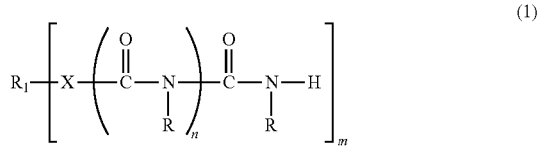

(1)

wherein $R_1$ represents a residue other than an active hydrogen group of an active hydrogen group-containing compound (be; X represents an oxygen or sulfur atom; R represents a residue comprising an unreacted isocyanate group of an isocyanate group-containing compound (a2); m represents an integer of 1 or 2; n represents an integer of 1 to 30 when m is 1; and n represents an integer of 1 to 15 when m is 2.

(2) The composition for forming polyurethane resin with an allophanate group according to the above item (1), wherein the isocyanate component (A) is present in the state of liquid at ambient temperature.

(3) The composition for forming polyurethane resin with an allophanate group according to the above item (1) or (2), wherein the content of the isocyanate group-containing compound (a1) represented by the formula (1) in the isocyanate component (A) is 20 to 90 peak area % as measured by gel permeation chromatography.

(4) The composition for forming polyurethane resin with an allophanate group according to any one of the above items (1) to (3), wherein the isocyanate group-containing compound (a1) is an allophanate group-containing polyisocyanate composition, which is a reaction product between diphenylmethane diisocyanate and an alcohol, wherein a molar ratio of the allophanate group and an isocyanurate group is 80:20 to 100:0, and the composition comprises at least one selected from the group consisting of a carboxylic acid amide, a sulfonic acid amide and an active methylene compound represented by formula (2) and a tertiary amine catalyst as allophanatization reaction aids, and contains no metal catalyst.

[Chemical Formula 4]

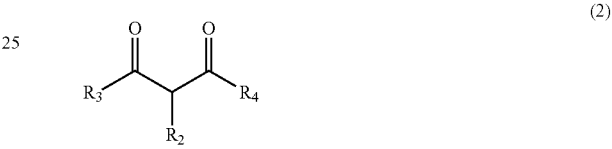

(2)

wherein $R_2$ is selected from H, an alkyl group, an alkenyl group, a cycloalkyl group, an arylalkyl group and an aryl group; $R_3$ and $R_4$ are each independently selected from an OH group, an alkyl group, an alkenyl group, a cycloalkyl group, an arylalkyl group, an aryl group, an oxyalkyl group, an oxyalkenyl group, an oxycycloalkyl group, an oxyarylalkyl group and an oxyaryl group.

(5) The composition for forming polyurethane resin with an allophanate group according to any one of the above items (1) to (4), wherein the isocyanate group-containing compound (a2) is an aromatic isocyanate having two or more isocyanate groups.

(6) The composition for forming polyurethane resin according to any one of the above items (1) to (5), wherein the isocyanate group-containing compound (a2) is diphenylmethane diisocyanate.

(7) The composition for forming polyurethane resin with an allophanate group according to any one of the above items (1) to (6), wherein the active hydrogen group-containing compound (b1) is a monool or diol having 1 to 70 carbon atoms.

(8) Use of the composition for forming polyurethane resin with an allophanate group according to any one of the above items (1) to (7) as a sealing material for a membrane module.

(9) A method for producing the composition for forming polyurethane resin with an allophanate group according to any one of the above items (1) to (7), comprising reacting the isocyanate component (A) with the polyol component (B).

(10) A sealing material comprising a cured material of the composition for forming polyurethane resin with an allophanate group according to any one of the above items (1) to (7).

(11) A membrane module sealed with the sealing material according to the above item (10).

(12) A polyisocyanate composition with an allophanate group, which is a reaction product between diphenylmethane diisocyanate and an alcohol, wherein a molar ratio of the allophanate group and an isocyanurate group is 80:20 to 100:0, and the composition comprises at least one selected from the group consisting of a carboxylic acid amide, a sulfonic acid amide and an active methylene compound represented by formula (2) and a tertiary amine catalyst as allophanatization reaction aids, and contains no metal catalyst.

[Chemical Formula 5]

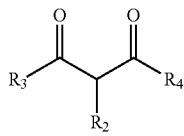

(2)

wherein $R_2$ is selected from H, an alkyl group, an alkenyl group, a cycloalkyl group, an arylalkyl group and an aryl group; $R_3$ and $R_4$ are each independently selected from an OH group, an alkyl group, an alkenyl group, a cycloalkyl group, an arylalkyl group, an aryl group, an oxyalkyl group, an oxyalkenyl group, an oxycycloalkyl group, an oxyarylalkyl group and an oxyaryl group.

(13) A method for producing a polyisocyanate composition with an allophanate group, comprising allophanatizing
  (E) diphenylmethane diisocyanate and
  (F) at least one alcohol component in the presence of
  (G) at least one selected from the group consisting of a carboxylic acid amide and a sulfonic acid amide and an active methylene compound represented by formula (2), and using
  (H) a tertiary amine as a catalyst; and
terminating the reaction by
  (J) a catalyst poison.

[Chemical Formula 6]

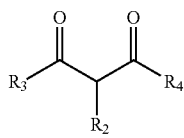

(2)

wherein $R_2$ is selected from H, an alkyl group, an alkenyl group, a cycloalkyl group, an arylalkyl group and an aryl group; $R_3$ and $R_4$ are each independently selected from an OH group, an alkyl group, an alkenyl group, a cycloalkyl group, an arylalkyl group, an aryl group, an oxyalkyl group, an oxyalkenyl group, an oxycycloalkyl group, an oxyarylalkyl group and an oxyaryl group.

(14) The method for producing a polyisocyanate composition with an allophanate group according to the above item (13), wherein the allophanatization is performed by using the tertiary amine and a quaternary ammonium salt in combination as a catalyst (H).

(15) The method for producing a polyisocyanate composition with an allophanate group according to the above item (13) or (14), wherein a metal catalyst is not contained as the catalyst (H).

(16) The method for producing a polyisocyanate composition with an allophanate group according to any one of the above items (13) to (15), wherein a molar ratio of the allophanate group and an isocyanurate group is 80:20 to 100:0.

Note that, the ambient temperature in the present invention refers to a temperature of −5° C. to 45° C.

In the present invention, a means for attaining the first object is referred to as Embodiment 1; whereas, a means for attaining the second object is referred to as Embodiment 2.

Advantageous Effects of Invention

As a first effect, it is possible to particularly improve reactivity, reduction of viscosity and low-temperature storage stability by use of the composition for forming polyurethane resin of the present invention. Note that, the composition for forming polyurethane resin according to the present invention is present in the state of liquid at ambient temperature (for example, 25° C.). Due to the excellent effect, the composition is extremely suitably used as a desired binding material (i.e., sealing material for a membrane module) for medical and industrial fluid separation devices using a hollow fiber separation membrane or a flat sheet separation membrane.

As a second effect according to the present invention, it is possible to obtain a polyisocyanate composition containing an allophanate group without metal compound, where an amount of isocyanurate that causes turbidity is low. This composition can be used to obtain the first effect. In addition, the reaction in obtaining a polyisocyanate composition with an allophanate group can be easily controlled. These features are industrially extremely useful.

DESCRIPTION OF EMBODIMENTS

Figure 1:
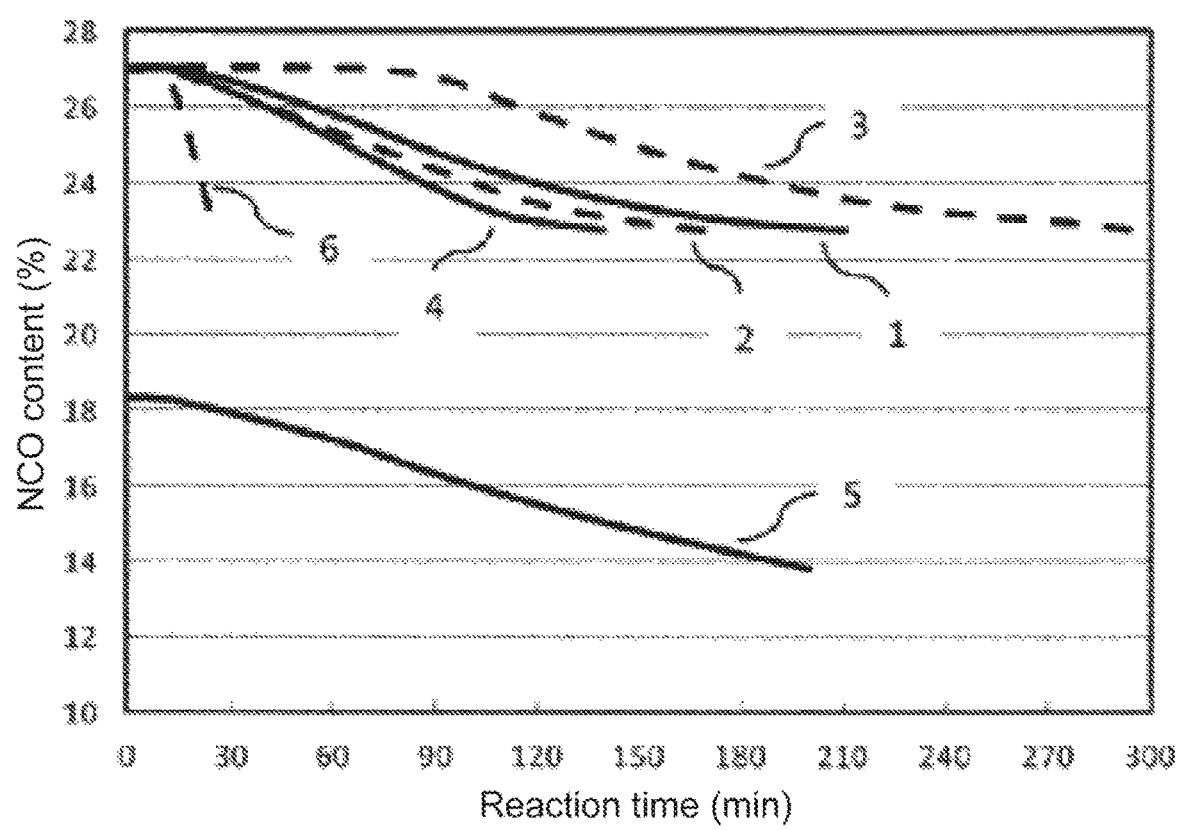
FIG. 1 The figure is a graph showing a time-depending change of the NCO content in the process of the reactions of Examples and Comparative Examples.

The present invention will be more specifically described below.

A composition for forming polyurethane resin, which attains the first object of the present invention, comprises an isocyanate component (A) and a polyol component (B) and is characterized by comprising, as the isocyanate component (A), an isocyanate group-containing compound (a1) represented by the formula (1), which is obtained by reacting an isocyanate group-containing compound (a2) and an active hydrogen group-containing compound (b1) in the presence of a catalyst (C).

<Isocyanate Component (A)>

In the present invention, the isocyanate component (A) comprises an isocyanate group-containing compound (a1) represented by the formula (1) and obtained by reacting an isocyanate group-containing compound (a2) and an active hydrogen group-containing compound (b1) in the presence of a catalyst (C).

The isocyanate group-containing compound (a2) used for the present invention is not particularly limited and any isocyanate group-containing compound can be used as long as it is a compound containing two or more isocyanate groups in a single molecule.

Examples of the compound containing two or more isocyanate groups in a single molecule include an aromatic isocyanate such as toluene diisocyanate, MDI, paraphenylene diisocyanate, metaphenylene diisocyanate, naphthalene-1,5-diisocyanate, triphenylmethane-4,4',4"-triisocyanate and polyphenylene polymethylene polyisocyanate; and an aliphatic or alicyclic isocyanate such as hexamethylene diisocyanate, 1,10-decane diisocyanate, 1,12-dodecane diisocyanate, cyclobutane-1,3-diisocyanate, cyclohexane-1,3- and 1,4-diisocyanates, isophorone diisocyanate, 2,4- and 2,6-hexahydrotoluene diisocyanates, hexahydro-1,3- and -1,4-phenylene diisocyanates, perhydro-2,4'- and -4,4'-diphenylmethane diisocyanates, and compounds obtained by applying isocyanurate modification, biuret modification, allophanate modification, uretdione modification, uretimine modification, carbodiimide modification, oxazolidone modification, amide modification and imide modification to a part of the isocyanates mentioned above. These may be used alone or in combination of two types or more.

Of these, an aromatic isocyanate is preferable and MDI is more preferable from the viewpoint that an excellent in work environment at the time of molding and satisfactory in physical properties (for example, mechanical strength such as hardness) required for a sealing material can be obtained.

In the present invention, as the active hydrogen group-containing compound (b1), a compound containing one or more active hydrogen groups in a single molecule can be used. A monovalent or a divalent compound is preferable from the viewpoint that a cured resin excellent in workability, satisfactory in physical properties required for a sealing material for membrane and excellent in productivity of a sealing material for membrane can be obtained. A trivalent or larger valent compound is not preferable because the viscosity of the resultant isocyanate component (A) is high. Note that the number of carbon atoms of the active hydrogen group-containing compound (b1) is preferably 1 to 70 and further preferably 3 to 30.

Examples of the compound (b1) having a monovalent or divalent active hydrogen group include an aliphatic, aromatic and alicyclic alcohol and diol, and a thiol.

Examples of the aliphatic alcohol include methanol, ethanol, propyl alcohol, butyl alcohol, amyl alcohol, lauryl alcohol and stearyl alcohol.

Examples of the aliphatic diol include ethylene glycol, propylene glycol, diethylene glycol, triethylene glycol, tetraethylene glycol, dipropylene glycol, polyethylene glycol, polypropylene glycol, neopentyl glycol, 1,3-butanediol, 1,4-butanediol, 1,5-pentane diol, 1,6-hexane diol, 2-butyl-2-ethyl-1,3-propanediol, methyl propane diol, and 3-methyl-1,5-pentane diol.

Examples of the aromatic alcohol include benzyl alcohol, phenethyl alcohol, hydroxybenzyl alcohol, hydroxyphenethyl alcohol and methoxyphenyl methanol.

Examples of the aromatic diol include 1,4-benzene dimethanol and 2,3-naphthalenedimethanol.

Examples of the alicyclic alcohol include cyclohexanol, methyl cyclohexanol and dimethylcyclohexanol.

Examples of the alicyclic diol include 1,2-cyclopentanediol, 1,3-cyclopentanediol, 3-methyl-1,2-cyclopentanediol, 1,2-cyclohexanediol, 1,3-cyclohexanediol, 1,4-cyclohexanediol, 4,4'-bicyclohexanol and 1,4-cyclohexanedimethanol.

Examples of the thiol include tridecyl mercaptopropionate, methoxybutyl mercaptopropionate, octyl mercaptopropionate, a 3-mercaptobutyrate derivative and 1,4-bis(mercaptomethyl)benzene.

Of these, an aliphatic alcohol and an aliphatic diol are preferable, and 2-propanol, 2-ethylhexanol and tridecanol are particularly preferable from the viewpoint that suitable physical properties required for the resultant sealing material for membrane are obtained.

The content of a monomeric isocyanate present in the isocyanate component (A) was obtained based on the ratio (%) of a peak area (hereinafter also referred to as PA %) obtained by GPC. The monomeric isocyanate content in a (target) measurement sample is preferably 10.0 to 70.0 PA % and more preferably 20.0 to 60.0 PA %. From the viewpoint that molding processability in producing a membrane sealing material is excellent, the monomeric isocyanate content most preferably falls within the range of 30.0 to 50.0 PA %.

The isocyanate-group content in the isocyanate component (A) is preferably 3 to 30 mass % and more preferably 5 to 28 mass %. From the viewpoint that molding processability in producing a membrane sealing material is excellent, the isocyanate-group content is most preferably 10 to 26 mass %.

The presence of the structure (a1) represented by the formula (1) and contained in the isocyanate component (A) was confirmed by $^{13}$C-NMR.

(1) Measuring device: ECX400M (manufactured by JEOL Ltd.)
(2) Measurement temperature: 23° C.
(3) Sample concentration: 0.1 g/ml
(4) Solvent: Chloroform-d
(5) Evaluation method: the presence of the structure (a1) was confirmed based on the signals (120 ppm, 152 ppm, 156 ppm) derived from the structure (a1).

The content of the structure (a1) in the isocyanate component (A), which is obtained based on PA % provided by GPC, is preferably 20 to 90 PA %, further preferably 30 to 80 PA % and most preferably 50 to 70 PA % of a (target) measurement sample.

The viscosity of the isocyanate component (A) is preferably 250 to 1500 mPa·s at 25° C. in order to obtain satisfactory moldability at a low viscosity.

<Polyol Component (B)>

In the present invention, the compound to be used as the polyol component (B) is not particularly limited and any compound can be used as long as it contains an active hydrogen group. Examples of the compound include a low molecular weight polyol, a polyether polyol, a polyester polyol, a polylactone polyol, a castor-oil polyol, a polyolefin polyol and a hydroxyl group-containing amine compound. These can be used alone or in combination (two types or more). Of these, a castor-oil polyol is preferable because chemical resistance and elution resistance are excellent.

Examples of the low molecular weight polyol include a bivalent polyol such as ethylene glycol, diethylene glycol, propylene glycol, 1,2-, 1,3- or 1,4-butanediol, 1,5-pentane diol, 3-methyl-1,5-pentane diol, 1,6-hexane glycol, 1,8-octanediol, 1,10-decandiol, neopentyl glycol and hydrogenated bisphenol A; and trivalent or larger valent polyols such as glycerin, trimethylolpropane, hexanetriol, pentaerythritol and sorbitol. The molecular weight of a low molecular weight polyol is preferably 50 to 200.

Examples of the polyether polyol include alkylene oxide adducts of the aforementioned low molecular weight polyols (adduct of an alkylene oxide having 2 to 4 carbon atoms, such as ethylene oxide, propylene oxide and butylene oxide); and ring-opened polymers of alkylene oxides. More specifically, polypropylene glycol, polyethylene glycol, polytetramethylene ether glycol or an ethylene oxide-propylene oxide copolymer, i.e., tipped ether, is mentioned. The molecular weight of the polyether polyol is preferably 200 to 7000. Note that, from the viewpoint that molding processability of a sealing material for membrane during its production is excellent, the molecular weight thereof is further preferably 500 to 5000.

Examples of the polyester polyol include a polyol obtained by condensation polymerization of a polycarboxylic acid (aliphatic saturated or unsaturated polycarboxylic acid such as azelaic acid, dodecanoic acid, maleic acid, fumaric acid, itaconic acid, ricinoleic acid, dimerized linoleic acid; and an aromatic polycarboxylic acid such as phthalic acid, isophthalic acid and terephthalic acid) and a polyol (at least one polyol selected from the group consisting of the low molecular weight polyols mentioned above and a polyether polyol). The molecular weight of the polyester polyol is preferably 200 to 5000. Note that, from the viewpoint that molding processability of a sealing material for membrane during production is excellent, the molecular weight thereof is more preferably 500 to 3000.

Examples of the polylactone polyol include a polyol obtained by addition polymerization of at least one lactone selected from the group consisting of e.g., ε-caprolactone, α-methyl-ε-caprolactone, ε-methyl-ε-caprolactone and β-methyl-σ-valero lactone, to a polymerization initiator such as a glycol or a triol, in the presence of a catalyst such as an organometallic compound, a metal chelate compound and a fatty acid metal acyl compound. The molecular weight of the polylactone polyol is preferably 200 to 5000. From the viewpoint that molding processability of a sealing material for membrane during production is excellent, the molecular weight thereof is further preferably 500 to 3000.

Examples of the castor-oil polyol include a linear or branched polyester obtained by the reaction between a castor oil fatty acid and a polyol (at least one polyol selected from the group consisting of the low molecular weight polyols mentioned above and a polyether polyol), such as diglyceride and monoglyceride of a castor oil fatty acid, a mono-, di- or tri-ester of a castor oil fatty acid and trimethylolalkane, and a mono-, di- or tri-ester of a castor oil fatty acid and polypropylene glycol. The molecular weight of the castor-oil polyol is preferably 300 to 4000. Note that, from the viewpoint that molding processability of a sealing material for membrane during production is excellent, the molecular weight thereof is further preferably 500 to 3000.

Examples of the polyolefin polyol include a polybutadiene polyol prepared by introducing a hydroxyl group to all end of a polybutadiene or a butadiene-styrene or butadiene-acrylonitrile copolymer.

Besides this, a polyether ester polyol prepared by introducing an alkylene oxide such as ethylene oxide and propylene oxide to a polyester having at least one group selected from the group consisting of a carboxyl group and a hydroxyl group at an end through addition reaction is mentioned.

Examples of the hydroxyl group-containing amine compound include an oxyalkylated derivative of an amino compound such as an amino alcohol.

Examples of the amino alcohol include a propylene oxide or ethylene oxide adduct of an amino compound such as ethylenediamine, including mono, di and triethanolamines such as N,N,N',N'-tetrakis[2-hydroxypropyl] ethylenediamine and N,N,N',N'-tetrakis[2-hydroxyethyl] ethylenediamine; and N-methyl-N,N'-diethanolamine. Of them, a propylene oxide or ethylene oxide adduct of an amino compound such as ethylenediamine is preferable, and N,N,N',N'-tetrakis[2-hydroxypropyl] ethylenediamine is more preferable. Use of N,N,N',N'-tetrakis[2-hydroxypropyl] ethylenediamine is effective in improving processability in molding and lowering the amount of an eluate.

The content of the hydroxyl group-containing amine compound, when used, relative to the content of a polyol component (B) as 100 mass % preferably falls within the range of 1 to 30 mass % and particularly preferably within the range of 5 to 25 mass %. When the ratio (the content) in the polyol (B) is less than 1 mass %, the effect of the hydroxyl group-containing amine compound cannot be obtained. In contrast, when the ratio (the content) exceeds 30 mass %, reactivity becomes excessively high, with the result that workability and filling property may deteriorate, and, in addition, the hardness of the resultant sealing material may become excessively high.

<Catalyst (C)>

As the catalyst (C), all catalysts known in the art that can accelerate the allophanatization reaction between an isocyanate group-containing compound (a2) and an active hydrogen group-containing compound (b1), are included. Examples thereof include a metal salt, a quaternary ammonium salt and a tertiary amine.

Examples of the metal salt include zinc acetylacetonate (ZnAcAc), stannous octoate and zinc octoate.

Examples of the quaternary ammonium salt include compounds obtained by combining a tetraalkylammonium such as N,N,N,N,-tetramethylammonium and N,N,N-trimethyl-N-octylammonium, and a hydroxyalkyltrialkylammonium such as N-(2-hydroxyethyl)-N,N,N,-trimethylammonium, N-(2-hydroxypropyl)-N,N,N,-trimethylammonium; and a counter ion such as a chloride, a bromide, a hydroxide, a formate, a caproate, a hexanoate, 2-ethyl hexanoate and a monoalkyl carbonate.

Examples of the tertiary amine include a trialkylamine such as N,N,N-benzyldimethylamine, N,N,N-dibenzylmethylamine, N,N,N-cyclohexyldimethylamine, N-methyl morpholine, N,N,N-tribenzylamine, N,N,N-tripropylamine, N,N,N-tributylamine and N,N,N-tripentyl amine or N,N,N-trihexylamine; a polymethyl polyalkylene polyamine such as N,N,N',N'-tetramethylethylenediamine and N,N,N',N', N''-pentamethyldiethylenetriamine; and a tertiary amino alcohol such as 2-(N,N-dimethylamino)ethanol, 3-(N,N-dimethylamino)propanol, 2-(N,N-dimethylamino)-1-methylpropanol, {2-(N,N-dimethylamino)ethoxy}ethanol and {2-(N,N-diethylamino)ethoxy}ethanol.

The content of the catalyst (C) relative to the mass of the isocyanate component (A) is preferably 1 to 100 ppm and more preferably 10 to 50 ppm. When the content is less than 1 ppm, a reaction may not proceed. In contrast, when the content exceeds 100 ppm, the reaction proceeds fast and may be hardly controlled.

<Terminating Agent (D)>

In the present invention, a terminating agent (D) is used for terminating an allophanatization reaction. As the terminating agent (D), all agents inactivating catalyst (C) and known in the art are included. Examples thereof includes an acidulated phosphate compound such as phosphoric acid, pyrophosphoric acid, metaphosphoric acid and polyphosphoric acid, a monoalkyl or dialkyl ester of phosphoric acid, pyrophosphoric acid, metaphosphoric acid and polyphosphoric acid, halogenated acetic acid such as monochloroacetate, benzoyl chloride, hydrochloric acid, sulfuric acid, a sulfuric acid ester, an ion exchange resin and a chelating agent. The terminating agent (D) is preferably added in the equivalent amount or more to the mole number of the catalyst (C) and preferably added in the amount 1.0 to 1.5 times as large as the mole number of the catalyst.

The polyisocyanate composition with an allophanate group, which can attain the second object of the present invention, is an allophanate group-containing polyisocyanate composition, which is a reaction product of MDI and an alcohol, wherein a molar ratio of the allophanate group and an isocyanurate group is 80:20 to 100:0, and the composition contains no metal catalyst.

When a tertiary amine catalyst (H) is used as an allophanatization catalyst, the reaction rapidly proceeds and hardly controlled. Even if the reaction can be terminated after a desired reaction rate is obtained, the production amount of isocyanurate is high, with the result that the resultant prepolymer tends to become cloudy.

For the reason, it is useful to carry out the reaction in the presence of at least one compound (G) selected from the group consisting of a carboxylic acid amide, a sulfonic acid amide and an active methylene compound represented by the formula (2).

When a reaction is carried out with a tertiary amine catalyst (H) in the presence of at least one compound (G) selected from the group consisting of a carboxylic acid amide, a sulfonic acid amide and an active methylene compound represented by the formula (2), the reaction moderately proceeds and allophanatization selectively proceeds, with the result that a prepolymer containing a small amount of isocyanurate group is obtained and the reaction is easily controlled.

As the MDI (E) (hereinafter also referred to as "E component") to be used in the present invention, any monomeric MDI can be used as long as it is generally available. Examples of the isomer of the monomeric MDI include 2,2'-MDI (0 to 5 wt %), 2,4'-MDI (0 to 95 wt %) and 4,4'-MDI (5 to 100 wt %).

In order to obtain a prepolymer having a lower viscosity, it is preferable to use monomeric MDI as mentioned above as E component to be used in the present invention; however, if it is acceptable to increase the viscosity to some extent, a polymeric MDI such as polymethylene polyphenylene polyisocyanate can be used.

In this case, the content of polymethylene polyphenylene polyisocyanate is preferably 0 to 50 wt % of the isocyanate component to be used. When the content exceeds 50 wt %, the viscosity is excessively high and insoluble matter is easily generated.

As at least one alcohol component (F) (hereinafter also referred to as "F component") to be used in the present invention, a compound containing 1 to 2 hydroxyl groups in average, in other words, a monool or diol, can be used. A compound containing a phenolic hydroxyl group is not preferable because the ratio of isocyanurate group to be produced increases, leading to high viscosity. A triol or a larger valent polyol is not preferable because viscosity also increases.

Examples of a preferable monool serving as F component and to be used in the present invention include aliphatic mono-alcohols such as methanol, ethanol, propanol, 1- and 2-butanols, 1-pentanol, 1-hexanol, 2-methyl-1-pentanol, 4-methyl-2-pentanol, 2-ethyl-1-butanol, 1-heptanol, 1-octanol, 2-octanol, 2-ethylhexanol, 3,5-dimethyl-1-hexanol, 2,2, 4-trimethyl-1-pentanol, 1-nonanol, 2,6-dimethyl-4-heptanol, 1-decanol, 1-undecanol, 1-dodecanol, 1-tridecanol, 1-tetradecanol, 1-pentadecanol, 1-hexadecanol, 1-heptadecanol, 1-octadecanol, 1-nonadecanol, 1-eicosanol, 1-hexacosanol, 1-heptatricontanol, 1-oleyl alcohol and 2-octyldodecanol, and mixtures of these.

In addition to these aliphatic alcohols, polyalkylene glycol monoalkyl/aryl ethers, which are oxyalkylene adducts obtained by using, for example, a compound containing a phenolic hydroxyl group such as phenol, cresol, xylenol and nonylphenol, as an initiator and a mixture of these are mentioned. Furthermore, monocarboxylic acid esters of polyalkylene glycols and mixtures thereof are mentioned.

Examples of a preferable diol serving as F component and to be used in the present invention include aliphatic glycols such as ethylene glycol, 1,3-propanediol, 1,2-propanediol, 1,4-butanediol, 2-methyl-1,3-propanediol, 1,5-pentane diol, 2,2'-dimethyl-1,3-propanediol, 1,6-hexane diol and 2-methyl-2-butyl-1,3-propanediol; and polyalkylene glycols which are oxyalkylene adducts obtained by using glycol as an initiator and mixtures of these.

Examples of at least one carboxylic acid amide (G) (hereinafter also referred to as "G component") selected from the group consisting of the carboxylic acid amide, a sulfonic acid amide and an active methylene compound represented by the formula (2) and to be used in the present invention include formamide, acetamide, propionic acid amide, butanoic acid amide, isobutanoic acid amide, hexanoic acid amide, octanoic acid amide, 2-ethylhexanoic acid amide, oleic acid amide, stearic acid amide, benzamide, 2-phenylacetamide, 4-methylbenzamide, 2-aminobenzamide, 3-aminobenzamide, 4-aminobenzamide; and mixtures of these.

Examples of the sulfonic acid amide serving as G component to be used in the present invention include methyl sulfonamide, butylsulfonamide, t-butylsulfonamide, phenylsulfonamide, benzylsulfonamide, o-toluylsulfonamide, p-toluylsulfonamide, 3-aminophenylsulfonamide, 4-aminophenylsulfonamide; and mixtures of these.

Examples of the active methylene compound serving as G component to be used in the present invention include acetylacetone, 3-methyl-2,4-pentanedione, 3-ethyl-2,4-pentanedione, 3,5-heptanedione, 3,5-heptanedione, 6-methyl-2, 4-heptanedione, methyl acetoacetate, ethyl acetoacetate, methyl 3-oxopentanoate, malonic acid, dimethyl malonate and diethyl malonate; and mixtures of these.

Examples of the tertiary amine (H) (hereinafter also referred to as "H component") to be used in the present invention include a trialkylamine, a polymethyl polyalkylene polyamine and a tertiary amino alcohol.

Examples of the trialkylamine include N,N,N-benzyldimethylamine, N,N,N-dibenzylmethylamine, N,N,N-cyclohexyldimethylamine, N-methyl morpholine, N,N,N-tribenzylamine, N,N,N-tripropylamine, N,N,N-tributylamine N,N,N-triphenyl amine and N,N,N-trihexylamine.

Examples of the polymethyl polyalkylene polyamine include N,N,N',N'-tetramethylethylenediamine and N,N,N', N',N''-pentamethyldiethylenetriamine.

Examples of the tertiary amino alcohol include 2-(dimethylamino)ethanol, 3-(dimethylamino) propanol, 2-(dimethylamino)-1-methyl propanol, 2-{2-(dimethylamino) ethoxy}ethanol, 2-{2-(diethylamino)ethoxy}ethanol and 2-[{2-(dimethylamino) ethyl}methylamino]ethanol.

Of these, a tertiary amino alcohol is particularly preferable because it is less volatile during a reaction and elution of the alcohol itself from the resultant final resin is low.

In the case where a reaction is carried out in the presence of H component alone, if the time until the reaction is initiated (hereinafter also referred to as "induction period") becomes long, it is effective to use a quaternary ammonium salt in combination. Since the reaction is initiated in a few minutes after addition of a quaternary ammonium salt, the quaternary ammonium salt is useful to shorten production time.

As the quaternary ammonium salt to be used in combination with H component, for example, compounds obtained by combining a tetraalkylammonium or a hydroxyalkyltrialkylammonium with a counter ion can be used.

Examples of the tetraalkylammonium include N,N,N,N,-tetramethylammonium and N,N,N-trimethyl-N-octylammonium.

Examples of the hydroxyalkyltrialkylammonium include N-(2-hydroxyethyl)-N,N,N-trimethylammonium and N-(2-hydroxypropyl)-N,N,N,-trimethylammonium.

Examples of the counter ion to be combined with ammonium as mentioned above include chloride, bromide, hydroxide, formate, caproate, hexanoate, 2-ethyl hexanoate and monoalkyl carbonate.

Of these, a carboxylate and a monoalkyl carbonate are preferable as the counter ion to be combined, in view of compatibility with MDI; however, any one of tetraalkylammoniums may be preferably used.

Note that it is not effective to use a quaternary ammonium salt alone without using a tertiary amine, because a reaction cannot be controlled by G component in the presence of only quaternary ammonium salt and the quaternary ammonium salt is inactivated in the process of the reaction.

G component to be used in the present invention can be added in any time in the period from just before a urethanization reaction with E component and F component to just after initiation of an allophanatization reaction. However, after G component is added and H component is added at an interval, its effect cannot be exerted. Because of this, it is preferable that G component is added in the period from just before addition of H component to initiation of an allophanatization reaction or G component is added simultaneously with H component within the range from just before initiation of an urethanization reaction to after completion of the urethanization reaction.

The addition amount of H component in the present invention relative to the total amount of E component and F component is generally preferably 0.1 to 100 ppm and particularly preferably 1 to 50 ppm although the amount varies depending on its catalytic activity. When the amount is less than 0.1 ppm, the reaction may not proceed. In contrast, when the addition amount of H component is beyond 100 ppm, the reaction rapidly proceeds and may not be hardly controlled.

The addition amount of G component to be used in the present invention is preferably about 0.1 to 50 times as high as the amount of H component in terms of mole. When the addition amount is less than 0.1 time in terms of mole, the reaction rapidly proceeds and cannot be controlled. In contrast, when the addition amount of G component is beyond 50 times in terms of mole, the reaction may not substantially proceed.

As the temperature of allophanatization of E component and F component with G component and H component increases, the ratio of an allophanate group to be produced increases and viscosity tends to decrease; however, a side reaction such as urethodionization and carbodiimidization tend to occur. In contrast, in the reaction at a low temperature, the amount of the isocyanurate group to be produced increases and viscosity increases. Because of this, the reaction temperature is preferably 20° C. or more and 200° C. or less. To suppress the ratio of an isocyanurate group to be produced up to 20 mol % and obtain lower viscosity, the reaction temperature is preferably 60° C. or more and 160° C. or less.

The catalyst poison (J) (hereinafter also referred to as "J component") to be used in the present invention is suitably an acidic substance. Examples thereof include anhydrous hydrogen chloride, sulfuric acid, phosphoric acid, a monoalkyl sulfuric acid ester, an alkylsulfonic acid, an alkylbenzene sulfonic acid, a mono or dialkyl phosphate ester, benzoyl chloride and Lewis acid. The addition amount of (J) component is preferably equivalent or more to the mole number of a catalyst, i.e., H component: a tertiary amine, or a quaternary ammonium salt, and preferably 1.0 to 1.5 times as large as the mole number of the catalyst.

EXAMPLES

Now, the present invention will be more specifically described by way of Examples and Comparative Examples; however, the present invention should not be construed as being limited by these examples. Note that, "%" in the following refers to "wt %" unless otherwise specified.

Embodiment 1

The following components were used in Examples and Comparative Examples.

<Isocyanate (a11)>
4,4'-MDI, trade name "Millionate MT (manufactured by Tohso Corporation)", isocyanate-group content=33.6 (mass %)

<Isocyanate (a12)>
A mixture of 2,4'-MDI and 4,4'-MDI, trade name "Millionate NM (manufactured by Tohso Corporation)", isocyanate-group content 33.6 (mass %)

<Isocyanate (a13)>
A carbodiimide-modified product of 4,4'-MDI, trade name "CORONATE MX (manufactured by Tohso Corporation)", isocyanate-group content=29.1 (mass %)

<Isocyanate (a14)>
A carbodiimide-modified product of 4,4'-MDI, trade name "Millionate MTL-C (manufactured by Tohso Corporation)", isocyanate-group content=28.6 (mass %)

<Polyol (b11)>
2-ethylhexanol, number of functional groups=1.0, molecular weight=130

<Polyol (b12)>
Isotridecanol, number of functional groups=1.0, molecular weight=200, hydroxyl value=275 (mg KOH/g)

<Polyol (b13)>
Castor oil, trade name "Castor oil LAV (manufactured by ITOH OIL CHEMICALS CO., LTD.)", average number of functional groups=2.7, hydroxyl value=160 (mg KOH/g), Number average molecular weight: 1000

<Polyol (b14)>
Polypropylene glycol, average number of functional groups=2, hydroxyl value=110 (mg KOH/g), Number average molecular weight: 1000

<Polyol (b15)>
N,N,N',N'-tetrakis[2-hydroxypropyl]ethylenediamine, number of functional groups=4.0, hydroxyl value=760 (mg KOH/g)

<Catalyst (C)>
Zinc Acetylacetone

<Terminating Agent (D)>
2-Ethylhexyl phosphate (monoester:diester=1:1 by mole)

Production Example 1: Production of Isocyanate Component (A-1)

A 2 L four-necked flask equipped with a thermometer, a stirrer, a nitrogen sealing pipe and a cooling pipe was purged with nitrogen. To the flask, 871.9 g of isocyanate (a11) was supplied. The temperature was raised and stirring was initiated. At the time point when the temperature reached 70°

C., 128.1 g of polyol (b11) was added. The reaction solution was allowed to react by mixing the solution with stirring in a nitrogen atmosphere at 90° C. for one hour to obtain an isocyanate group-terminated prepolymer. To the prepolymer, a catalyst (C) was added. The mixture was heated to 90° C. While taking an aliquot from the mixture to measure an NCO content, the reaction was monitored. At the time point when the NCO content was predicted to reach 21.0%, a specific amount of terminating agent (D) was added to terminate the reaction. The isocyanate component (A-1) thus obtained was light yellow and transparent. The viscosity of the component at 25° C. was 550 mPa·s.

Production Examples 2 to 4, 13 and 14: Production of Isocyanate Components (A-2) to (A-4), (A-13) and (A-14)

Isocyanate components (A-2) to (A-4), (A-13) and (A-14) shown in Table 1 were obtained in the same manner as in Production Example 1 except that the compositions of starting materials were prepared in accordance with Table 1.

Production Example 5: Production of Isocyanate Component (A-5)

A 2 L four-necked flask equipped with a thermometer, a stirrer, a nitrogen sealing pipe and a cooling pipe was purged with nitrogen. To the flask, 724.2 g of isocyanate (a11) was supplied. The temperature was raised and stirring was initiated. At the time point when the temperature reached 50° C., 275.8 g of polyol (b13) was added. The reaction solution was allowed to react by mixing the solution with stirring in a nitrogen atmosphere at 70° C. for 5 hours to obtain an isocyanate group-terminated prepolymer (A-5). The isocyanate component (A-5) was light yellow and transparent. The NCO content thereof was 21.0% and the viscosity thereof at 25° C. was 480 mPa·s.

Production Examples 6 to 12: Production of Isocyanate Components (A-6) to (A-12)

Isocyanate components (A-6) to (A-12) shown in Table 2 were obtained in the same manner as in Production Example 5 except that compositions of starting materials were prepared in accordance with Table 2.

Preparation Example 1: Preparation of Polyol Component (B-1)

A polyol component (B-1) was prepared by mixing 80 parts by mass of polyol (b13) and 20 parts by mass of polyol (b15).

Examples 1 to 4, Comparative Examples 1 to 6

Isocyanate components ("A-1" to "A-4", "A-6", "A-8" to "A-12", "A-13", "A-14") and a polyol component "B-1" were mixed in accordance with the combinations shown in Tables 3 and 4 and so as to satisfy the ratio of an isocyanate group/active hydrogen group=1.00 (equivalent ratio) to obtain composition for forming polyurethane resins. Note that, isocyanate components "A-5" and "A-7" had unsatisfactory low-temperature storage stability, and turbidity and solid matter were observed. Because of this, they were not used for preparing a composition by mixing it with "B-1".

<Viscosity Measurement>

The viscosity of each of (A-1) to (A-14) at a liquid temperature of 25° C. was measured by B-type rotational viscometer.

<Measurement of Monomeric MDI Content and Structure (a1) Content>

In (A-1) to (A-14), monomeric MDI content (PA %) and the structure (a1) content (PA %) were obtained by GPC in the following conditions and method.

[Measurement Conditions]

Measuring device: "HLC-8120 (trade name)" (manufactured by Tohso Corporation)

Column: Columns charged with 3 types of fillers: TSKgel G3000HXL, TSKgel G2000HXL, TSKgel G1000HXL (all are trade names, manufactured by Tohso Corporation) were connected in series. Measurement was performed at a column temperature of 40° C.

Detector: Refractometer (RI)

Eluent: Tetrahydrofuran (THF) (flow rate: 1 ml/min, 40° C.)

Calibration curve: Calibration curve was obtained by using polystyrene of the following grade (TSK standard POLYSTYRENE). F-2 (1.81×104) F-1 (1.02×104) A-5000 (5.97×103) A-2500 (2.63×103) A-500 (Mw=6.82×102, 5.78×102, 4.74××102, 3.70×102, 2.66×102) toluene (Mw=92)

Sample: THF 10 ml Solution of a Sample (0.05 g).

[Measuring Method]

First of all, a calibration curve was obtained from a chart of polystyrene used as a standard substance, which was obtained by detection based on refractive index difference. Subsequently, from charts of individual samples obtained by detection based on refractive index difference and based on the same calibration curve, a peak area (PA %) near a peak top molecular weight (number average molecular weight) of 230 representing monomeric MDI and PA % near peak top molecular weights (number average molecular weight) of 3800, 3360, 2600, 2000, 1260 and 700 representing the structures (a1) were obtained.

<Low-Temperature Storage Stability>

Samples (A-1) to (A-14) were allowed to stand still at a 0° C.-environment for 3 months and then appearance of the samples was checked. A case where light yellow and transparent appearance was observed was rated as "O"; whereas a case where turbidity or solid matter was observed was rated as "X".

<Evaluation of Hardness of Cured Material>

Composition for forming polyurethane resins prepared in accordance with the combinations shown in Tables 3 and 4 were separately defoamed under vacuum (at 10 to 20 kPa for 3 minutes) and then poured in stainless-steel molds (100 mm×100 mm×8 mm). After the molds were allowed to stand still at 45° C. for 2 days to cure the compositions, cured materials were unmolded. The cured materials thus obtained were subjected to measurement for Shore D hardness at 25° C. The results are shown in Tables 3 and 4. Note that, the hardness was measured in accordance with JIS K 7312.

<Evaluation of Initial Viscosity of a Mixture>

Composition for forming polyurethane resins were prepared in accordance with the combinations shown in Tables 3 and 4 by homogeneously mixing a main agent and a curing agent at a liquid temperature of 25° C. so as to obtain a ratio of isocyanate group/active hydrogen group=1.00 (equivalent ratio). The viscosity of the composition for forming polyurethane resins just prepared was measured. The results are shown in Tables 3 and 4.

<Evaluation of Reactivity>

Composition for forming polyurethane resins each were prepared in accordance with the combinations shown in Tables 3 and 4. After a main agent and a curing agent (the total amount of the main agent and curing agent=100 g) of each composition were homogeneously mixed at a liquid temperature of 25° C. so as to obtain a ratio of isocyanate group/active hydrogen group=1.00 (equivalent ratio), viscosity increase (of the composition) was monitored by a rotational viscometer (B type, No. 4 rotor) in a 25° C. atmosphere. The time from initiation of mixing the main agent and the curing agent until the viscosity of the composition reached 50000 mPa·s was specified as a pot life and reactivity was evaluated. The results are shown in Tables 3 and 4. In consideration of moldability, a pot life of 2.5 minutes or more and less than 7 minutes was evaluated as "good".

TABLE 1

|  | Production Example 1 A-1 | Production Example 2 A-2 | Production Example 3 A-3 | Production Example 4 A-4 | Production Example 13 A-13 | Production Example 14 A-14 |
|---|---|---|---|---|---|---|
| Isocyanate a11 | 871.9 | 833.7 |  |  | 892.5 | 857.0 |
| Isocyanate a12 |  |  | 871.9 | 833.7 |  |  |
| Isocyanate a13 |  |  |  |  |  |  |
| Polyol b11 | 128.1 |  | 128.1 |  | 107.5 | 143.0 |
| Polyol b12 |  | 166.3 |  | 166.3 |  |  |
| Polyol b13 |  |  |  |  |  |  |
| Polyol b14 |  |  |  |  |  |  |
| Appearance | Light-yellow, transparent | Light-yellow, transparent | Light-yellow, transparent | Light-yellow, transparent | Light-yellow, transparent | Light-yellow, transparent |
| Viscosity (mPa · s @25° C.) | 550 | 450 | 560 | 460 | 300 | 1200 |
| NCO content (%) | 21 | 21 | 21 | 21 | 23 | 19.5 |
| Monomeric MDI content (PA %) | 43 | 41 | 43 | 41 | 53 | 39 |
| Structure (a1) amount (PA %) | 57 | 59 | 57 | 59 | 47 | 61 |
| Low-temperature storage stability (0° C., 3 months) | ○ | ○ | ○ | ○ | ○ | ○ |

TABLE 2

|  | Production Example 5 A-5 | Production Example 6 A-6 | Production Example 7 A-7 | Production Example 8 A-8 |
|---|---|---|---|---|
| Isocyanate a11 | 724.2 |  | 371.3 | 700.1 |
| Isocyanate a12 |  | 724.2 |  |  |
| Isocyanate a13 |  |  | 396.0 |  |
| Polyol b11 |  |  |  |  |
| Polyol b12 |  |  |  |  |
| Polyol b13 | 275.8 | 275.8 | 232.7 |  |
| Polyol b14 |  |  |  | 299.9 |
| Appearance | Light-yellow, transparent | Light-yellow, transparent | Light-yellow, transparent | Light-yellow, transparent |
| Viscosity (mPa · s @25° C.) | 480 | 490 | 630 | 260 |
| NCO content (%) | 21 | 21 | 21 | 21 |
| Monomeric MDI content (PA %) | 54 | 54 | 49 | 56 |
| Structure (a1) amount (PA %) | 0 | 0 | 0 | 0 |
| Low-temperature storage stability (0° C., 3 months) | X | ○ | X | ○ |

|  | Production Example 9 A-9 | Production Example 10 A-10 | Production Example 11 A-11 | Production Example 12 A-12 |
|---|---|---|---|---|
| Isocyanate a11 | 647.3 |  | 208.3 | 604.5 |
| Isocyanate a12 |  | 647.3 |  |  |
| Isocyanate a13 |  |  | 529.7 |  |
| Polyol b11 |  |  |  |  |
| Polyol b12 |  |  |  |  |
| Polyol b13 | 352.7 | 352.7 | 262.0 |  |
| Polyol b14 |  |  |  | 395.5 |
| Appearance | Light-yellow, transparent | Light-yellow, transparent | Light-yellow, transparent | Light-yellow, transparent |
| Viscosity (mPa · s @25° C.) | 790 | 800 | 1370 | 920 |
| NCO content (%) | 17.5 | 17.5 | 19 | 17 |
| Monomeric MDI content (PA %) | 42 | 42 | 43 | 42 |
| Structure (a1) amount (PA %) | 0 | 0 | 0 | 0 |
| Low-temperature storage stability (0° C., 3 months) | ○ | ○ | ○ | ○ |

TABLE 3

|  | Example 1 | Example 2 | Example 3 | Example 4 | Example 5 | Example 6 |
|---|---|---|---|---|---|---|
| Main agent (A) | A-1 | A-2 | A-3 | A-4 | A-13 | A-14 |
| Curing agent (B) | B-1 | B-1 | B-1 | B-1 | B-1 | B-1 |
| NCO/OH (molar ratio) | 1.00 | 1.00 | 1.00 | 1.00 | 1.00 | 1.00 |
| Structure (a1) amount (PA %) | 29 | 30 | 29 | 30 | 23 | 32 |
| Hardness, 10-second value (Shore D) | 65 | 57 | 65 | 57 | 62 | 66 |
| Initial viscosity of mixture (mPa · s) | 800 | 720 | 810 | 730 | 500 | 890 |
| Pot life (min) | 6 | 6 | 6 | 6.5 | 5.5 | 6.5 |

TABLE 4

|  | Comparative Example 1 | Comparative Example 2 | Comparative Example 3 | Comparative Example 4 | Comparative Example 5 | Comparative Example 6 |
|---|---|---|---|---|---|---|
| Main agent (A) | A-6 | A-8 | A-9 | A-10 | A-11 | A-12 |
| Curing agent (B) | B-1 | B-1 | B-1 | B-1 | B-1 | B-1 |
| NCO/OH (molar ratio) | 1.00 | 1.00 | 1.00 | 1.00 | 1.00 | 1.00 |
| Structure (a1) amount (PA %) | 0 | 0 | 0 | 0 | 0 | 0 |
| Hardness, 10-second value (Shore D) | 60 | 53 | 56 | 56 | 77 | 46 |
| Initial viscosity of mixture (mPa · s) | 750 | 550 | 940 | 950 | 1260 | 1020 |
| Pot life (min) | 9 | 9 | 8 | 10 | 7 | 10.5 |

Isocyanate components (A-1) to (A-4), (A-13) and (A-14) according to Production Examples 1 to 4, 13 and 14, shown in Tables 1 and 2, have low viscosity and are excellent in low-temperature storage stability. In contrast, isocyanate components (A-5) and (A-7) according to Production Example 5 and Production Example 7 have low viscosity but are inferior in low-temperature storage stability. Isocyanate components (A-9) to (A-12) according to Production Examples 9 to 12 are excellent in low-temperature storage stability but high in viscosity.

As shown in Tables 3 and 4, composition for forming polyurethane resins according to Examples 1 to 6 all are low in initial viscosity of the mixture and short in pot life. These are well balanced for molding. In contrast, composition for forming polyurethane resins according to Comparative Example 1 and Comparative Example 2 are low in initial viscosity of the mixture but long in pot life. Because of this, long time is required for molding a membrane module. Composition for forming polyurethane resins according to Comparative Example 3 to 6 all are high in initial viscosity of the mixture. Because of this, workability in filling a mold with the compositions in molding a membrane module is inferior and filling may fail.

Embodiment 2

The following components were used in Examples and Comparative Examples.

Iso E1; Millionate NM (manufactured by Tohso Corporation, isomer 55.0%)
Iso E2; Millionate MT (manufactured by Tohso Corporation, isomer 1.0%)
Poly F1; 2-Butanol (manufactured by Tokyo Chemical Industry Co., Ltd.)
POLY F2; 2-Octyldodecanol (trade name KALCOL 200GD, manufactured by KAO CORP.)
Poly F3; Tridecanol (manufactured by KH Neochem Co., Ltd.)
Amide G1; 3-Aminophenylsulfonamide (manufactured by Tokyo Chemical Industry Co., Ltd.)
Amide G2; 2-Aminobenzamide (manufactured by Tokyo Chemical Industry Co., Ltd.)
Methylene G3; Acetylacetone (manufactured by Tokyo Chemical Industry Co., Ltd.)
Methylene G4; Diethyl malonate (manufactured by Tokyo Chemical Industry Co., Ltd.)
Catalyst H1; 2-[{2-(Dimethylamino)ethyl}methylamino]ethanol (trade name TOYOCAT RX5, manufactured by Tohso Corporation)
Catalyst H2; 2-{2-(Dimethylamino)ethoxy}ethanol (trade name: TOYOCAT RX3, manufactured by Tohso Corporation)
Catalyst H3; Trimethyloctylammonium formate
Catalyst poison J; Benzoyl chloride (manufactured by Tokyo Chemical Industry Co., Ltd.)

Allophanate group and isocyanurate group were quantified by $^{13}$C-NMR.

(1) Measuring device: ECX400M (manufactured by JEOL Ltd.)
(2) Measurement temperature: 23° C.
(3) Sample concentration: 0.1 g/1 mL
(4) Solvent: Chloroform-d
(5) Coupling: None
(6) Waiting time for pulse: 2 seconds
(7) Cumulated number: 8000
(8) Evaluation method: Molar ratios of individual functional groups were calculated based on the area ratio of signals from carbonyl of individual functional groups shown below:

Allophanate group; 151 ppm, 156 ppm
Isocyanurate group; 149 ppm

In Examples and Comparative Examples, "specific amount" refers to the amounts of individual components in the compositions described in Table 5.

Example 7

To a 1 L four-necked flask, a specific amount of Iso E1 was added. The temperature of the flask was controlled to be 50° C. while stirring under nitrogen flow. Subsequently, a specific amount of Poly F1 was added while stirring. After heat generation from urethanization reaction was terminated, the temperature of the mixture was raised up to 110° C. After the internal temperature was stabilized at 110° C., a specific amount of Amide G1 diluted with Poly F1 up to 1% was added. Immediately upon the addition, a specific amount of Catalyst H1 diluted with Poly F1 up to 1% was added. About 20 minutes after the addition of Catalyst H1, an increase of the temperature of the solution was confirmed. Thereafter, while measuring the content of NCO by taking an aliquot from the solution, the reaction was monitored with time. At the time point at which the NCO content was predicted to be 22.8%, a specific amount of Catalyst poison J was added to terminate the reaction. The prepolymer thus synthesized was a light yellow and transparent liquid at ambient temperature and contained a small amount of isocyanurate group. A desired prepolymer of the present invention was obtained. The properties of the prepolymer and the molar ratio of individual functional groups are shown in Table 5 and a change of NCO content in the process of the reaction is shown FIG. 1. Stable reactivity was shown and the reaction was easily controlled.

Example 8

To a 1 L four-necked flask, a specific amount of Iso E2 was added. The temperature of the flask was controlled to be 50° C. while stirring under nitrogen flow. Subsequently, a specific amount of Poly F1 was added while stirring. After heat generation from a urethanization reaction was terminated, the temperature of the mixture was raised up to 110° C. After the internal temperature was stabilized at 110° C., a specific amount of Catalyst H1 diluted with Poly F1 up to 1% was added. About 15 minutes after the addition of Catalyst H1, an increase of the temperature of the solution was confirmed. At this time point, a specific amount of Amide G1 diluted with Poly F1 up to 1% was added. Thereafter, while measuring the content of NCO by taking an aliquot from the solution, the reaction was monitored with time. At the time point at which the NCO content was predicted to be 22.8%, a specific amount of Catalyst poison J was added to terminate the reaction. The prepolymer thus synthesized was a light yellow and transparent liquid at ambient temperature and contained a small amount of isocyanurate group. A desired prepolymer (P-1) of the present invention was obtained. The properties of the prepolymer and the molar ratio of individual functional groups are shown in Table 5 and a change of NCO content in the process of the reaction is shown FIG. 1. Stable reactivity was shown and the reaction was easily controlled.

Example 9

To a 1 L four-necked flask, a specific amount of Iso E1 was added. The temperature of the flask was controlled to be 50° C. while stirring under nitrogen flow. Subsequently, a specific amount of Poly F1 was add while stirring. After heat generation from a urethanization reaction was terminated, the temperature of the mixture was raised up to 110° C. After the internal temperature was stabilized at 110° C., a specific amount of amide G1 diluted with Poly F1 up to 1% was added. Immediately upon the addition, a specific amount of Catalyst H2 diluted with Poly F1 up to 1% was added. About 80 minutes after the addition of Catalyst H2, an increase of the temperature of the solution was confirmed. Thereafter, while measuring the content of NCO by taking an aliquot from the solution, the reaction was monitored with time. At the time point at which the NCO content was predicted to be 22.8%, a specific amount of Catalyst poison J was added to terminate the reaction. The prepolymer thus synthesized was a light yellow and transparent liquid at ambient temperature and contained a small amount of isocyanurate group. A desired prepolymer of the present invention was obtained. The properties of the prepolymer and the molar ratio of individual functional groups are shown in Table 5 and a change of NCO content in the process of the reaction is shown FIG. 1. Stable reactivity was shown and the reaction was easily controlled.

Example 10

To a 1 L four-necked flask, a specific amount of Iso E1 was added. The temperature of the flask was controlled to be 70° C. while stirring under nitrogen flow. Subsequently, a specific amount of Poly F1 was added while stirring. Immediately upon the addition, a specific amount of Catalyst H3 diluted with Poly F1 up to 1% was added. Subsequently, a specific amount of amide G1 diluted with Poly F1 up to 1% was added. Immediately upon the addition, a specific amount of Catalyst H2 diluted with Poly F1 up to 1% was added. The temperature of the mixture was controlled to be 110° C. About 15 minutes after Catalyst H3 was added, an increase of the temperature of the solution was confirmed. Thereafter, while measuring the content of NCO by taking an aliquot from the solution, the reaction was monitored with time. At the time point at which the NCO content was predicted to be 22.8%, a specific amount of Catalyst poison J was added to terminate the reaction. The prepolymer thus synthesized was a light yellow and transparent liquid at ambient temperature and contained a small amount of isocyanurate group. A desired prepolymer of the present invention was obtained. The properties of the prepolymer and the molar ratio of individual functional groups are shown in Table 5 and a change of NCO content in the process of the reaction is shown FIG. 1. Stable reactivity was shown and the reaction was easily controlled.

Example 11

To a 1 L four-necked flask, a specific amount of Iso E2 was added. The temperature of the flask was controlled to be 50° C. while stirring under nitrogen flow. Subsequently, a specific amount of Poly F2 was added while stirring. After heat generation from a urethanization reaction was terminated, the temperature of the mixture was raised up to 110° C. After the internal temperature was stabilized at 110° C., a specific amount of Catalyst H1 diluted with Poly F2 up to 1% was added. About 15 minutes after the addition of Catalyst H1, an increase of the temperature of the solution was confirmed. At this time point, a specific amount of amide G2 diluted with Poly F2 up to 1% was added. Thereafter, while measuring the content of NCO by taking an aliquot from the solution, the reaction was monitored with time. At the time point at which the NCO content was predicted to be 13.8%, a specific amount of Catalyst poison J was added to terminate the reaction. The prepolymer thus synthesized was a light yellow and transparent liquid at 25° C. and contained a small amount of isocyanurate group. A desired prepolymer (P-2) of the present invention was obtained. The properties of the prepolymer and the molar ratio of individual functional groups are shown in Table 5 and a change of NCO content in the process of the reaction is shown FIG. 1. Stable reactivity was shown and the reaction was easily controlled.

Example 12

Figure 2:
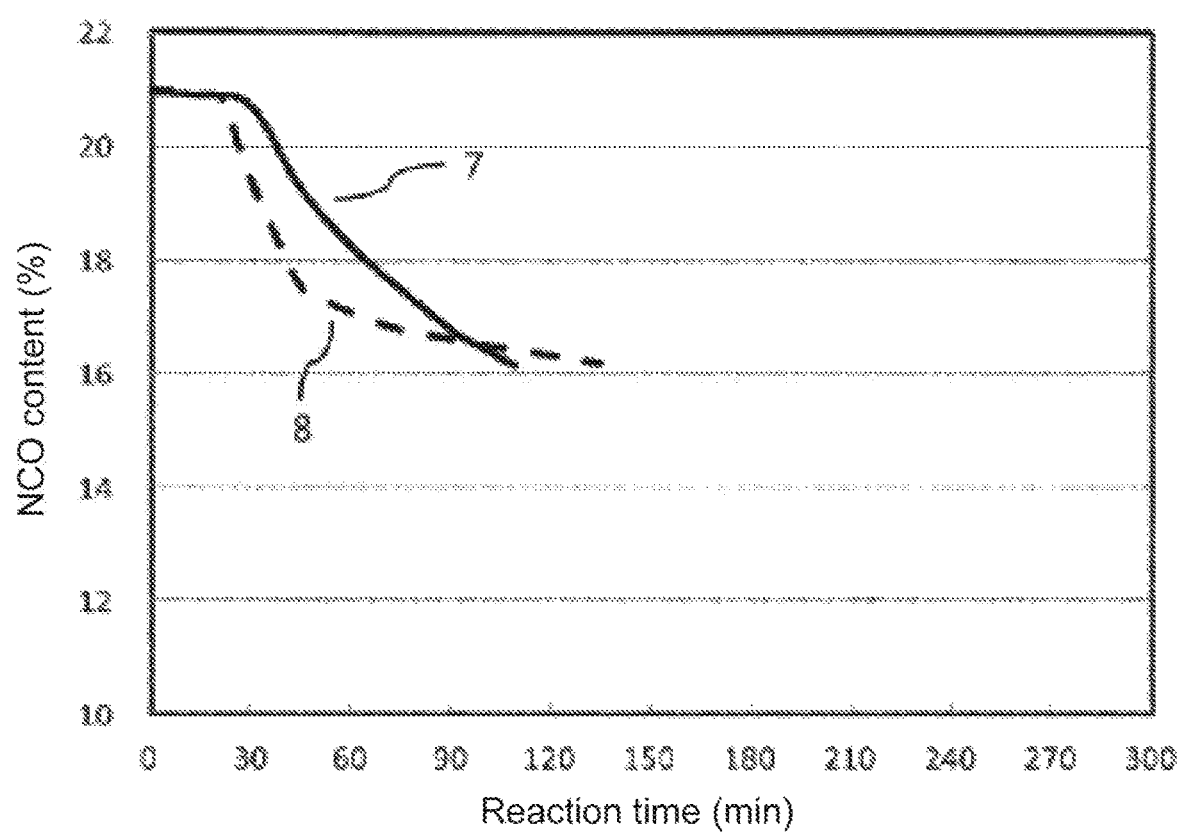
FIG. 2 The figure is a graph showing a time-depending change of the NCO content in the process of the reactions of Examples.

To a 1 L four-necked flask, a specific amount of Iso E2 was added. The temperature of the flask was controlled to be 50° C. while stirring under nitrogen flow. Subsequently, a specific amount of Poly F3 was added while stirring. After heat generation from a urethanization reaction was terminated, the temperature of the mixture was raised up to 110° C. After the internal temperature was stabilized at 110° C., a specific amount of methylene E3 diluted with Poly F3 up to 1% was added. Immediately upon the addition, a specific amount of Catalyst H1 diluted with Poly F3 up to 1% was added. About 20 minutes after the addition of Catalyst H1, an increase of the temperature of the solution was confirmed. Thereafter, while measuring the content of NCO by taking an aliquot from the solution, the reaction was monitored with time. At the time point at which the NCO content was predicted to be 16.1%, a specific amount of Catalyst poison J was added to terminate the reaction. The prepolymer thus synthesized was a light yellow and transparent liquid at ambient temperature and contained a small amount of isocyanurate group. A desired prepolymer (P-3) of the present invention was obtained. The properties of the prepolymer and the molar ratio of individual functional groups are shown in Table 5 and a change of NCO content in the process of the reaction is shown FIG. 2. Stable reactivity was shown and the reaction was easily controlled.

Example 13

To a 1 L four-necked flask, a specific amount of Iso E2 was added. The temperature of the flask was controlled to be 50° C. while stirring under nitrogen flow. Subsequently, a specific amount of Poly F3 was added while stirring. After heat generation from a urethanization reaction was terminated, the temperature of the mixture was raised up to 110° C. After the internal temperature was stabilized at 110° C., a specific amount of methylene G4 diluted with Poly F3 up to 1% was added. Immediately upon the addition, a specific amount of Catalyst H1 diluted with Poly F3 up to 1% was added. About 20 minutes after the addition of Catalyst H1, an increase of the temperature of the solution was confirmed. Thereafter, while measuring the content of NCO by taking an aliquot from the solution, the reaction was monitored with time. At the time point at which the NCO content was predicted to be 16.1%, a specific amount of Catalyst poison J was added to terminate the reaction. The prepolymer thus synthesized was a light yellow and transparent liquid at ambient temperature and contained a small amount of isocyanurate group. A desired prepolymer of the present invention was obtained. The properties of the prepolymer and the molar ratio of individual functional groups are shown in Table 5 and a change of NCO content in the process of the reaction is shown FIG. 2. Stable reactivity was shown and the reaction was easily controlled.

Comparative Example 7

To a 1 L four-necked flask, a specific amount of iso E2 was added. The temperature of the flask was controlled to be 50° C. while stirring under nitrogen flow. Subsequently, a specific amount of Poly F1 was added while stirring. After heat generation from a urethanization reaction was terminated, the temperature of the mixture was raised up to 110° C. After the internal temperature was stabilized at 110° C., a specific amount of Catalyst H1 diluted with Poly F1 up to 1% was added. About 15 minutes after the addition of Catalyst H1, an increase of the temperature of the solution was confirmed. After that, the researchers tried to monitor the reaction; however, they fail to control the temperature of the reaction due to rapid generation of heat and the solution mixture turned into gel. Thus, a desired prepolymer of the present invention was not obtained. The prepolymer obtained was not used as a prepolymer for attaining the first object.

Comparative Example 8

To a 1 L four-necked flask, a specific amount of Iso E1 was added. The temperature of the flask was controlled to be 50° C. while stirring under nitrogen flow. Subsequently, a specific amount of Poly F1 was added while stirring. After heat generation from a urethanization reaction was terminated, the temperature of the mixture was raised up to 110° C. After the internal temperature was stabilized at 110° C., a specific amount of Catalyst H1 diluted with Poly F1 up to 1% was added. About 10 minutes after the addition of Catalyst H1, an increase of the temperature of the solution was confirmed. After that, the researchers tried to monitor the reaction; however, they fail to control the temperature of the reaction due to rapid generation of heat. Then, a specific amount of Catalyst poison J was added when the internal temperature reached 124° C. to terminate the reaction. The prepolymer thus synthesized was a light yellow and transparent liquid at ambient temperature but contained a large amount of isocyanurate group. As a result, a desired prepolymer of the present invention was not obtained. Since the reaction was not controlled, the prepolymer obtained was difficult to use as a prepolymer for attaining the first object.

Examples 14 to 16

Similarly to Examples 1 to 4, isocyanate components, "P-1", "P-2", "P-3", a polyol component "B-1" were mixed in accordance with the combination shown in Table 6 and so as to obtain a molar ratio of isocyanate group/active hydrogen group=1.00 (equivalent ratio) to obtain composition for forming polyurethane resin. According to the Examples, when the allophanate group-containing polyisocyanate composition according to Embodiment 2 exhibiting easily controllable reaction, is applied to the composition for forming polyurethane resin according to Embodiment 1, the viscosity of the mixture and pot life can be satisfied.

TABLE 5

|  |  | Example 7 | Example 8 | Example 9 | Example 10 | Example 11 |
|---|---|---|---|---|---|---|
| Composition | Iso E1 (g) | 927.0 |  | 927.0 | 927.0 |  |
|  | Iso E2 (g) |  | 927.0 |  |  | 680.0 |
|  | Poly F1 (g) | 70.6 | 70.2 | 69.7 | 70.0 |  |
|  | Poly F2 (g) |  |  |  |  | 318.5 |
|  | Poly F3 (g) |  |  |  |  |  |

TABLE 5-continued

|  | | | | | |
|---|---|---|---|---|---|
| 1% Amide G1/poly F1 solution (g) | 0.9 | 2.1 | 1.3 | 1.0 | |
| 1% Amide G2/poly F2 solution (g) | | | | | 0.5 |
| 1% Methylene G3/poly F3 solution (g) | | | | | |
| 1% Methylene G4/poly F3 solution (g) | | | | | |
| 1% Catalyst H1/poly F1 solution (g) | 1.5 | 0.7 | | | |
| 1% Catalyst H1/poly F2 solution (g) | | | | | 1.0 |
| 1% Catalyst H1/poly F3 solution (g) | | | | | |
| 1% Catalyst H2/poly F1 solution (g) | | | 2.0 | 1.5 | |
| 1% Catalyst H3/poly F1 solution (g) | | | | 0.5 | |
| Catalyst poison J (g) | 0.039 | 0.018 | 0.028 | 0.025 | 0.026 |
| Amide:catalyst H molar ratio (times) | 0.5 | 2.5 | 0.5 | 0.5 | 0.5 |
| (G) Timing for addition of amide | Just before addition of Catalyst H1 | At the termination of induction period | Just before addition of Catalyst H2 | Just before addition of Catalyst H2 | At the termination of induction period |
| Reaction time (minutes) | 210 | 170 | 295 | 140 | 200 |
| Property Appearance | Transparent | Transparent | Transparent | Transparent | Transparent |
| NCO content (%) | 22.8 | 22.8 | 22.8 | 22.8 | 13.8 |
| Functional group molar ratio Allophanate | 94 | 93 | 94 | 93 | 90 |
| (mol %) Isocyanurate | 6 | 7 | 6 | 7 | 10 |
| (a1) Structure amount (PA %) | 49 | 50 | 49 | 49 | 75 |

|  | | Example 12 | Example 13 | Comparative Example 7 | Comparative Example 8 |
|---|---|---|---|---|---|
| Composition | Iso E1 (g) | | | | 927.0 |
| | Iso E2 (g) | 769.0 | 769.0 | 927.0 | |
| | Poly F1 (g) | | | 72.3 | 71.5 |
| | Poly F2 (g) | | | | |
| | Poly F3 (g) | 230.0 | 229.7 | | |
| | 1% Amide G1/poly F1 solution (g) | | | | |
| | 1% Amide G2/poly F2 solution (g) | | | | |
| | 1% Methylene G3/poly F3 solution (g) | 0.5 | | | |
| | 1% Methylene G4/poly F3 solution (g) | | 0.8 | | |
| | 1% Catalyst H1/poly F1 solution (g) | | | 0.7 | 1.5 |
| | 1% Catalyst H1/poly F2 solution (g) | | | | |
| | 1% Catalyst H1/poly F3 solution (g) | 0.5 | 0.5 | | |
| | 1% Catalyst H2/poly F1 solution (g) | | | | |
| | 1% Catalyst H3/poly F1 solution (g) | | | | |
| | Catalyst poison J (g) | 0.012 | 0.012 | 0.018 | 0.039 |
| Amide:catalyst H molar ratio (times) | | 1.5 | 1.5 | — | — |
| (G) Timing for addition of amide | | Just before addition of Catalyst H1 | Just before addition of Catalyst H1 | — | — |
| Reaction time (minutes) | | 110 | 136 | | 25 |
| Property | Appearance | Transparent | Transparent | Gel | Transparent |
| | NCO content (%) | 16.1 | 16.1 | — | 22.9 |
| Functional group molar ratio | Allophanate | 90 | 91 | — | 65 |
| (mol %) | Isocyanurate | 10 | 9 | — | 35 |
| (a1) Structure amount (PA %) | | 69 | 70 | — | 48 |

TABLE 6

|  | Example 14 | Example 15 | Example 16 |
|---|---|---|---|
| Main agent (A) | P-1 | P-2 | P-3 |
| Curing agent (B) | B-1 | B-1 | B-1 |
| NCO/OH (molar ratio) | 1.00 | 1.00 | 1.00 |
| (a1) Structure amount (PA %) | 25 | 42 | 40 |
| Hardness, 10 second value (Shore D) | 72 | 65 | 67 |
| Initial viscosity of mixture (mPa · s) | 700 | 1500 | 1700 |
| Pot life (min) | 5 | 6 | 5.5 |

The present invention has been described in detail with reference to specific embodiments. It is obvious to those skilled in the art that the present invention can be changed and modified in various ways without deviating the gist and range of the invention.

Note that, all the contents of the specifications, claims, drawings and abstracts of Japanese Patent Application No. 2015-252102 filed Dec. 24, 2015, Japanese Patent Application No. 2016-58205 filed Mar. 23, 2016 and Japanese Patent Application No. 2016-185222 filed Sep. 23, 2016 were cited and incorporated as the disclosure of the present invention, herein.

REFERENCE SIGNS LIST

1. A change of NCO content with reaction time in Example 7
2. A change of NCO content with reaction time in Example 8
3. A change of NCO content with reaction time in Example 9
4. A change of NCO content with reaction time in Example 10
5. A change of NCO content with reaction time in Example 11
6. A change of NCO content with reaction time in Comparative Example 8
7. A change of NCO content with reaction time in Example 12
8. A change of NCO content with reaction time in Example 13

The invention claimed is:

1. A composition for forming polyurethane resin with an allophanate group, wherein the composition is prepared by the process:

comprising reacting an isocyanate component (A) and a polyol component (B), wherein the isocyanate component (A) comprises an isocyanate group-containing compound (a1) represented by the following formula (1):

[Chemical Formula 1]

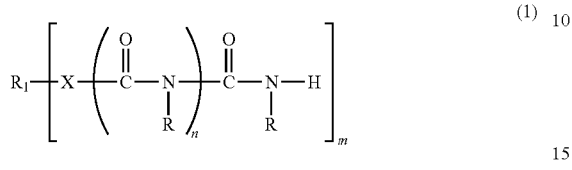

(1)

wherein $R_1$ represents a residue other than an active hydrogen group of an active hydrogen group-containing compound (b1); X represents an oxygen or sulfur atom; R represents a residue comprising an unreacted isocyanate group of an isocyanate group-containing compound (a2); m represents an integer of 1 or 2; n represents an integer of 1 to 30 when m is 1; and n represents an integer of 1 to 15 when m is 2; wherein the isocyanate group-containing compound (a1) is an allophanate group-containing polyisocyanate composition, and the allophanate group-containing polyisocyanate composition is prepared by the process of reacting diphenylmethane diisocyanate and an alcohol, wherein a molar ratio of the allophanate group and an isocyanurate group is 80:20 to 100:0; and wherein a content of the isocyanate group-containing compound (a1) represented by the formula (1) in the isocyanate component (A) is 20 to 90 peak area % as measured by gel permeation chromatography;

wherein the allophanate group-containing polyisocyanate composition is formed in the presence of at least one compound selected from the group consisting of a carboxylic acid amide compound, a sulfonic acid amide compound, and an active methylene compound represented by formula (2):

[Chemical Formula 2]

(2)

wherein $R_2$ is selected from H, an alkyl group, an alkenyl group, a cycloalkyl group, an arylalkyl group and an aryl group; $R_3$ and $R_4$ are each independently selected from an OH group, an alkyl group, an alkenyl group, a cycloalkyl group, an arylalkyl group, an aryl group, an oxyalkyl group, an oxyalkenyl group, an oxycycloalkyl group, an oxyarylalkyl group and an oxyaryl group;

wherein the allophanate group-containing polyisocyanate composition is formed in the presence of a tertiary amine catalyst as an aid to the allophanatization reaction; and wherein the allophanate group-containing polyisocyanate composition is not formed in the presence of a metal catalyst and contains no metal catalyst.

2. A composition for forming polyurethane resin with an allophanate group, wherein the composition is prepared by the process comprising:

reacting an isocyanate component (A) and a polyol component (B), wherein the isocyanate component (A) comprises an isocyanate group-containing compound (a1) represented by the following formula (1):

[Chemical Formula 1]

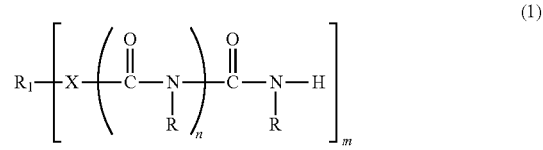

(1)

wherein $R_1$ represents a residue other than an active hydrogen group of an active hydrogen group-containing compound (b1); X represents an oxygen or sulfur atom; R represents a residue comprising an unreacted isocyanate group of an isocyanate group-containing compound (a2); m represents an integer of 1 or 2; n represents an integer of 1 to 30 when m is 1; and n represents an integer of 1 to 15 when m is 2; wherein the isocyanate group-containing compound (a1) is an allophanate group-containing polyisocyanate composition, and the allophanate group-containing polyisocyanate composition is prepared by the process of reacting diphenylmethane diisocyanate and an alcohol, wherein a molar ratio of the allophanate group and an isocyanurate group is 80:20 to 100:0; and wherein a content of the isocyanate group-containing compound (a1) represented by the formula (1) in the isocyanate component (A) is 30 to 90 peak area % as measured by gel permeation chromatography;

wherein the allophanate group-containing polyisocyanate composition is formed in the presence of at least one compound selected from the group consisting of a carboxylic acid amide compound, a sulfonic acid amide compound, and an active methylene compound represented by formula (2):

[Chemical Formula 2]

(2)

wherein $R_2$ is selected from H, an alkyl group, an alkenyl group, a cycloalkyl group, an arylalkyl group and an aryl group; $R_3$ and $R_4$ are each independently selected from an OH group, an alkyl group, an alkenyl group, a cycloalkyl group, an arylalkyl group, an aryl group, an oxyalkyl group, an oxyalkenyl group, an oxycycloalkyl group, an oxyarylalkyl group and an oxyaryl group;

wherein the allophanate group-containing polyisocyanate composition is formed in the presence of a tertiary amine catalyst as an aid to the allophanatization reaction; and wherein the allophanate group-containing polyisocyanate composition is not formed in the presence of a metal catalyst and contains no metal catalyst.

3. The composition for forming polyurethane resin with an allophanate group according to claim 2, wherein the isocyanate component (A) is present in the state of liquid at ambient temperature.

4. The composition for forming polyurethane resin with an allophanate group according to claim 2, wherein the content of the isocyanate group-containing compound (a1) represented by the formula (1) in the isocyanate component (A) is 30 to 80 peak area % as measured by gel permeation chromatography.

5. The composition for forming polyurethane resin with an allophanate group according to claim 2, wherein the active hydrogen group-containing compound (b1) is a monool or diol having 1 to 70 carbon atoms.

6. A sealing material comprising a cured material of the composition for forming polyurethane resin with an allophanate group according to claim 2.

7. A membrane module sealed with the sealing material according to claim 6.

8. The composition for forming polyurethane resin with an allophanate group of claim 2, wherein the tertiary amine catalyst is
a trialkylamine selected from the group consisting of N,N,N-dibenzylmethylamine, N-methyl morpholine, N,N,N-tribenzylamine, N,N,N-tripropylamine, N,N,N-tributylamine N,N,N-triphenyl amine, and N,N,N-trihexylamine;
a polymethyl polyalkylene polyamine selected from the group consisting of N,N,N',N'-tetramethylethylenediamine and N,N,N',N',N"-pentamethyldiethylenetriamine; or
a tertiary amino alcohol selected from the group consisting of 2-(dimethylamino)ethanol, 3-(dimethylamino)propanol, 2-(dimethylamino)-1-methyl propanol, 2-{2-(dimethylamino)ethoxy}ethanol, 2-{2-(diethylamino)ethoxy}ethanol, and 2-[{2-(dimethylamino)ethyl}methylamino]ethanol.

9. A polyisocyanate composition with an allophanate group, which is prepared by the process of reacting diphenylmethane diisocyanate and an alcohol, wherein a molar ratio of the allophanate group and an isocyanurate group is 80:20 to 100:0; in the presence of at least one compound selected from the group consisting of a carboxylic acid amide compound, a sulfonic acid amide compound, and an active methylene compound represented by formula (2):

[Chemical Formula 3]

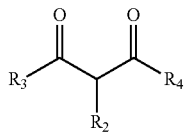

(2)

wherein $R_2$ is selected from H, an alkyl group, an alkenyl group, a cycloalkyl group, an arylalkyl group and an aryl group; $R_3$ and $R_4$ are each independently selected from an OH group, an alkyl group, an alkenyl group, a cycloalkyl group, an arylalkyl group, an aryl group, an oxyalkyl group, an oxyalkenyl group, an oxycycloalkyl group, an oxyarylalkyl group and an oxyaryl group;

and in the presence of a tertiary amine catalyst as an aid to the allophanatization reaction; and wherein the composition is not formed in the presence of a metal catalyst and contains no metal catalyst.

10. The composition for forming polyurethane resin with an allophanate group of claim 9, wherein the tertiary amine catalyst is a trialkylamine selected from the group consisting of N,N,N-dibenzylmethylamine, N-methyl morpholine, N,N,N-tribenzylamine, N,N,N-tripropylamine, N,N,N-tributylamine N,N,N-triphenyl amine, and N,N,N-trihexylamine;
a polymethyl polyalkylene polyamine selected from the group consisting of N,N,N',N'-tetramethylethylenediamine and N,N,N',N',N"-pentamethyldiethylenetriamine; or
a tertiary amino alcohol selected from the group consisting of 2-(dimethylamino)ethanol, 3-(dimethylamino)propanol, 2-(dimethylamino)-1-methyl propanol, 2-{2-(dimethylamino)ethoxy}ethanol, 2-{2-(diethylamino)ethoxy}ethanol, and 2-[{2-(dimethylamino)ethyl}methylamino]ethanol.

11. A method for producing a polyisocyanate composition with an allophanate group, comprising allophanatizing
(E) diphenylmethane diisocyanate and
(F) at least one alcohol component in the presence of
(G) at least one selected from the group consisting of a carboxylic acid amide and a sulfonic acid amide and an active methylene compound represented by formula (2), and using
(H) a tertiary amine as a catalyst; and
terminating the reaction by
(J) a catalyst poison,

[Chemical Formula 4]

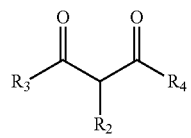

(2)

wherein $R_2$ is selected from H, an alkyl group, an alkenyl group, a cycloalkyl group, an arylalkyl group and an aryl group; $R_3$ and $R_4$ are each independently selected from an OH group, an alkyl group, an alkenyl group, a cycloalkyl group, an arylalkyl group, an aryl group, an oxyalkyl group, an oxyalkenyl group, an oxycycloalkyl group, an oxyarylalkyl group and an oxyaryl group.

12. The method for producing a polyisocyanate composition with an allophanate group according to claim 11, wherein the allophanatization is performed by using the tertiary amine and a quaternary ammonium salt in combination as a catalyst (H).

13. The method for producing a polyisocyanate composition with an allophanate group according to claim 11, wherein a metal catalyst is not contained as the catalyst (H).

14. The method for producing a polyisocyanate composition with an allophanate group according to claim 11, wherein a molar ratio of the allophanate group and an isocyanurate group is 80:20 to 100:0.

* * * * *